United States Patent [19]
Schaumberg

[11] 3,877,265
[45] Apr. 15, 1975

[54] THEFT PROTECTION DEVICE WITH CYLINDER LOCK, PARTICULARLY STEERING LOCK FOR MOTOR VEHICLES

[75] Inventor: Guenter Schaumberg, Radevormwald, Germany

[73] Assignee: Societe d'Exploitation des Brevets Neiman, Neuilly-sur-Seine, France

[22] Filed: Feb. 4, 1974

[21] Appl. No.: 439,158

[30] Foreign Application Priority Data
Feb. 28, 1973 Germany............................ 2309867

[52] U.S. Cl. ...................... 70/252; 70/360; 70/455
[51] Int. Cl............................................ E05b 65/12
[58] Field of Search ............ 70/252, 360, 420, 427, 70/455

[56] References Cited
UNITED STATES PATENTS
| 2,221,082 | 11/1940 | Fitzgerald | 70/252 |
| 3,724,244 | 4/1973 | Schaumburg | 70/360 |

*Primary Examiner*—Richard E. Moore
*Attorney, Agent, or Firm*—Nolte and Nolte

[57] ABSTRACT

A theft protection device, particularly for a steering lock for motor vehicles which comprises a lock cylinder core housed in a lock cylinder housing, said lock cylinder core being axially displaceable with respect to said housing, a key opening defined by displaceable means which are displaceable against said core when the key is inserted to effect axial displacement, said core biased toward said key opening by a coil spring, a controller cylinder disposed in axial alignment with said core and fixed thereto; said core and said cylinder rotatable in said housing, said controller cylinder containing a tongue member carried on an internally positioned spring mounted against a shoulder, said tonque projecting from said controller cylinder and engageable with a cam of a latch which engages said controller cylinder whereby when said tongue engages said cam said latch is held in an unlocked position by said controller cylinder. There is particularly disclosed a theft protection device wherein the latch further comprises spring means for urging the latch into locked position and the controller cylinder comprises an eccentric member, the latch has an extension member housing a spring which urges a protruding member against a face of the controller cylinder so as to position the controller cylinder and core toward the key opening, the eccentric member engaging the extension upon revolution of said core and said controller cylinder whereby upon axial displacement of said controller cylinder from entry of a key, said protruding member is displaced within said extension member and said latch is removed upon revolution from a locked position to an unlocked position.

5 Claims, 9 Drawing Figures

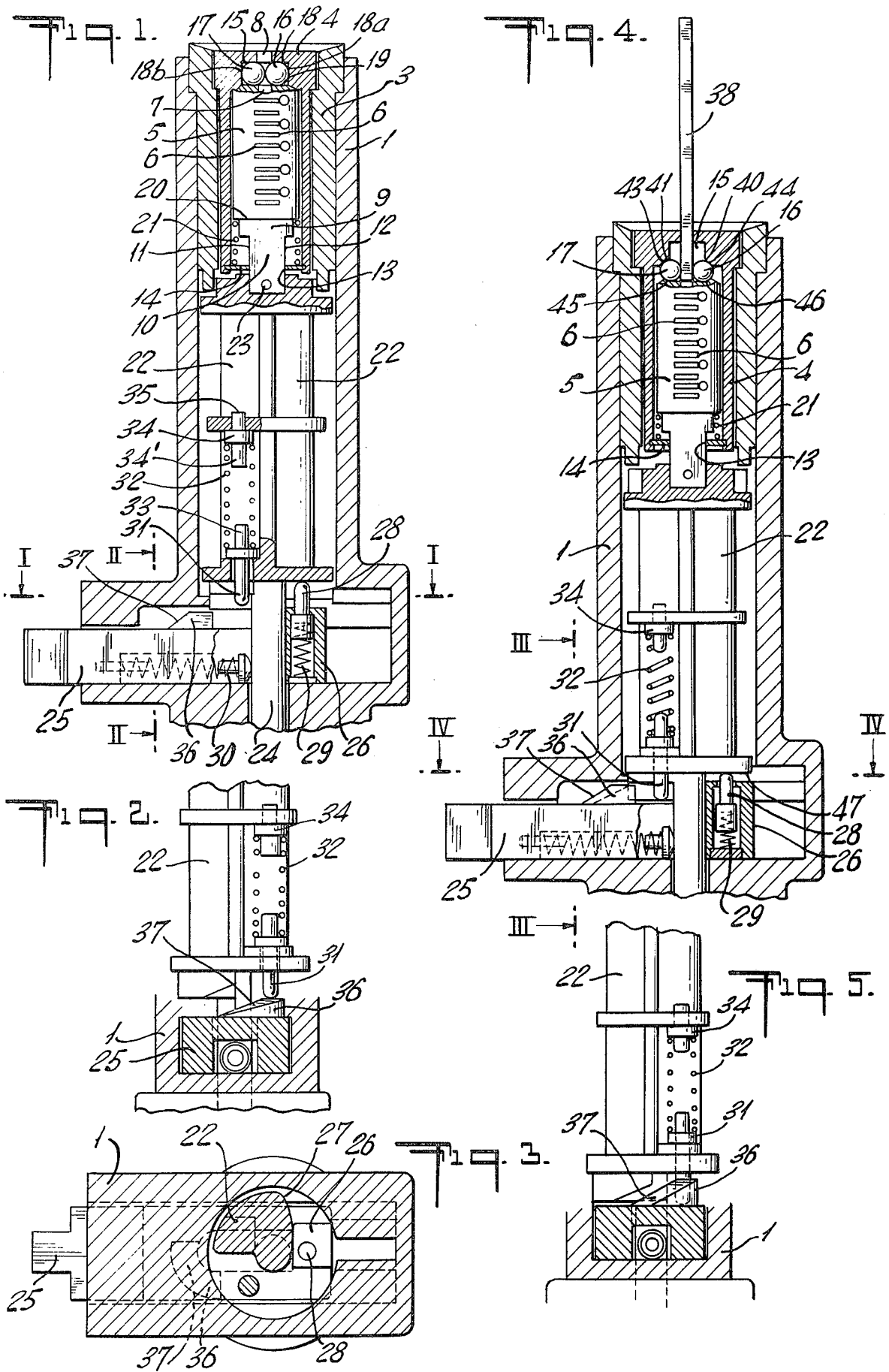

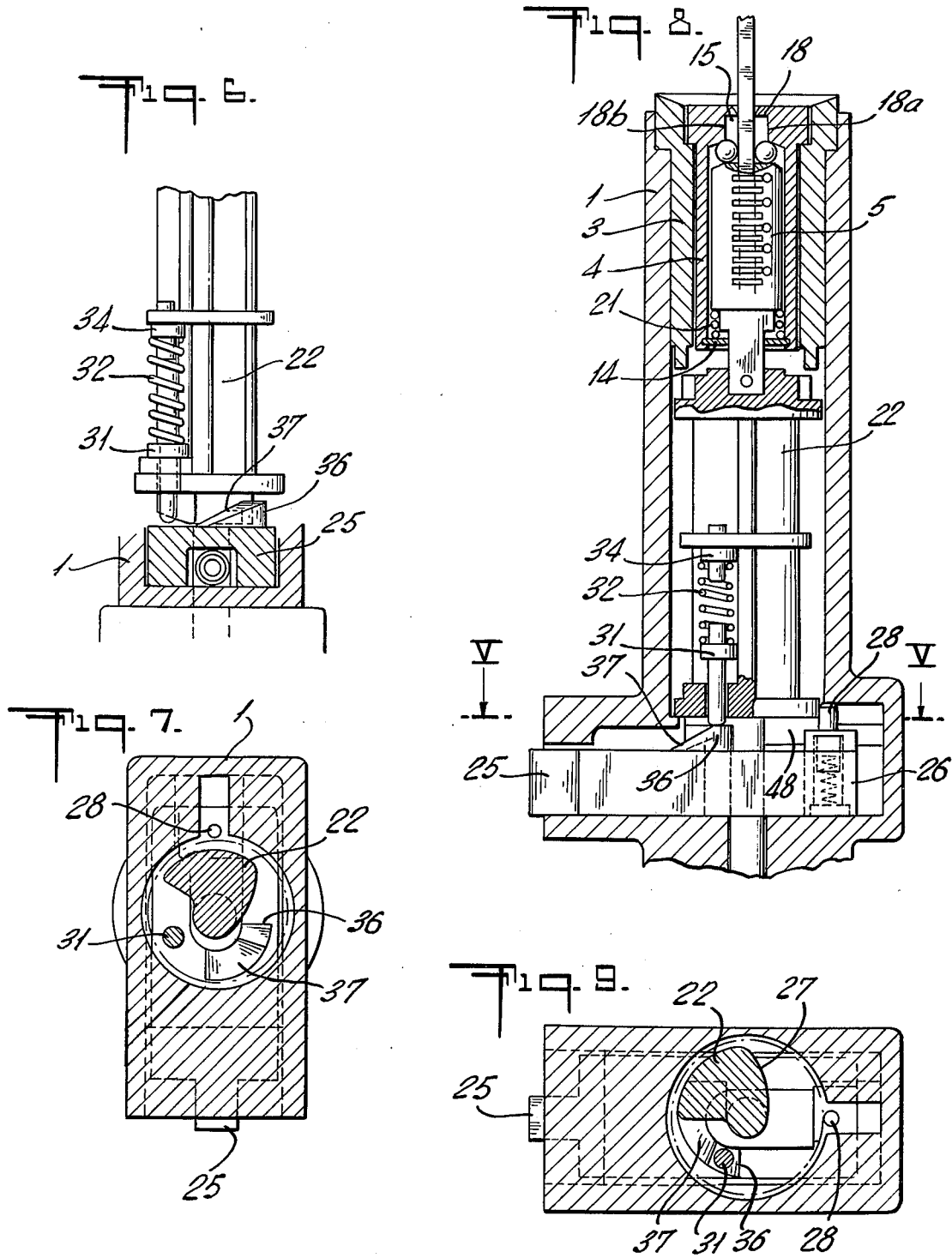

THEFT PROTECTION DEVICE WITH CYLINDER LOCK, PARTICULARLY STEERING LOCK FOR MOTOR VEHICLES

THE INVENTION AND ITS BACKGROUND

This invention relates to a theft protection device having a cylinder lock, particularly a theft protection device for a steering lock for motor vehicles. There is particularly contemplated a lock cylinder core which is locked in the parking position in a lock cylinder housing and can be turned in the lock cylinder housing only after axial displacement from the parking position upon full insertion of a key. The present invention particularly contemplates a theft protection device having a controller cylinder coupled to the lock cylinder core which controller cylinder is engageable by a latch in the parking position and which can be disengaged after axial displacement of the lock cylinder core and the controller cylinder by turning these two members into the driving position. In the assembly of the present invention the latch is held in the disengaged position, after turning it back into the stop position, by the controller cylinder and, if applicable, further parts of the lock, in the unlocked position, until the lock cylinder unlocked position, until the lock cylinder core with the controller cylinder is redisplaced axially by a spring means upon withdrawal of the key from the theft protection device.

Numerous theft protection devices are known and it is also known to utilize them on motor vehicles and in particular on the steering column. In one known theft protection device, the return of the lock cylinder core, the controller cylinder and other parts is accomplished after the key is pulled out solely by use of a single spring member. For this reason, its spring force must be made so strong that the spring loaded latch, which acts on the controller cylinder, cannot prevent the return movement of the lock cylinders and lock parts, as otherwise this vehicle would no longer be secured by blocking the steering.

In the known designs of the theft protection devices of the kind mentioned, the matching of the spring forces acting against one another becomes a problem particularly where larger dimensions are required in the axial direction for the springing forces, which together act against operating the theft protection device by means of a key, preclude providing the springs for the movable lock cylinders and lock parts arbitrarily stronger. Manufacture is complicated and expensive as all parts of the theft protection device must be carefully matched to one another with a minimum of friction, so that the theft protection device functions reliably.

It has thus becomes desirable to provide a theft protection device which allows for high reliability of operation and yet insures the axial displacement and redisplacement as the lock cylinder core and controller cylinder therein. Moreover, it has become desirable to provide a theft protection device wherein the controller cylinder houses a separate springing mechanism which bears against a cam member of the latch and in such position holds the latch in unlocked position. It is held in unlocked position by virtue of the placement and disposition of the controller cylinder.

It has also become desirable to improve the operational reliability of theft protection devices, particularly with respect to the action which return the lock cylinders and the controller cylinders to their original locked position. Stated differently, it has become an object of the present invention to improve the operational reliability of theft protection devices with respect to the return movement of the lock cylinders and lock parts without having to make thereby the springing forces stronger than should be normally necessary.

It has become desirable to provide a means for obviating the above described problems of prior art type cylinder locks which have encountered problems of balancing the springing forces and insuring that upon withdrawal of the key from the lock the axial displacement of the controller cylinder and lock cylinder core proceeds reliably.

SUMMARY OF THE INVENTION

The present invention is concerned with a theft protection device, particularly for a steering lock for motor vehicles, which device comprises a lock cylinder core housed in a lock cylinder housing, said lock cylinder core being axially displaceable with respect to said housing, a key opening defined by displaceable means which are displaceable against said core when the key is inserted to effect axial displacement, said core biased toward said key opening by a coil spring, a controller cylinder disposed in axial alignment with said core and affixed thereto, said core and said cylinder rotatable in said housing, said controller cylinder containing a tongue member carried by an internally positioned spring mounted against a shoulder, said tongue projecting from said controller cylinder and engageable with a cam of a latch which engages said controller cylinder whereby when said tongue engages said cam said latch is held in an unlocked position by said controller cylinder.

In a preferred embodiment of the present invention, there is contemplated a theft protection device of the type described wherein the latch further comprises springing means for urging the latch into locked position, the controller cylinder comprises an eccentric member, the latch has an extension member which houses a spring which spring urges a protruding member against a face of the controller cylinder so as to position the controller cylinder and the attached core member toward the key opening, the eccentric member engages the extension member upon revolution of the core and the controller cylinder whereby upon axial displacement of the controller cylinder due to entry of a key, the protruding member is displaced within said extension member and the latch is removed upon revolution from a locked position to an unlocked position.

The present invention is seen therefore to utilize a number of springing members which insure the proper disposition of forces within the cylindrical housing and which guarantee return of the cylinder core and controller cylinder upon removal of the key. Moreover, the apparatus of the present invention enables the controller cylinder itself to hold the latch member in an unlocked position when a protruding member in the form of a tongue engages a cam which is unitary and integral with the latch member. All of the above will be described in greater detail below.

It has been recognized from the discussion above that cylindrical locks wherein axial displacement is effected have been broadly suggested. Hence, the present invention can be considered to be an improvement in a theft protection device which device has a cylinder lock comprising a lock cylinder core which is locked in the parking position in a lock cylinder housing and which can be turned in said lock cylinder housing after it has undergone axial displacement while in said parked position by the full insertion of the key for said device, said device having a controller cylinder coupled to said lock cylinder core in general alignment therewith. The controller cylinder is engageable by a latch in the parking position which latch can be disengaged after axial displacement of said lock cylinder core and said controller cylinder by revolution of said cylinder core and controller cylinder into a driving position. The latch is held disengaged in a stop position by said controller cylinder and, in the unlocked position, is held in the disengaged position by said controller cylinder until the controller cylinder is axially displaced toward the key entrance.

The improvement resides in a provision for a springing means on which said lock cylinder core is mounted and which urges said lock cylinder core in axial displacement when the key is withdrawn. Springing means are longitudinally mounted within the controller cylinder and carry a protruding tongue which tongue engages in unlocked position a cam on said latch whereby to hold said latch in disengaged position, said springing means biasing said controller cylinder whereby disengagement of said cam from said cam urges the controller cylinder axially toward the key entrance and effects disengagement of said latch with said controller cylinder.

Thus the problems of the prior art are solved in accordance with the present invention by the provision that, for the purpose of assisting the axial return movement caused by the spring of the cylinder core coupled with the controller cylinder, there is provided a shoulder and a spring loaded tongue member in the form of a screw machine part which is located in the controller cylinder on the latch side and eccentrically, which in the unlocked position and with the spring tension, is braced against a cam carried by the latch.

By use of a spring member carrying a tongue and bearing against a shoulder on the controller cylinder in turn connected to the cylinder core, there is provided a force which aids the axial return movement only in the ready to lock, i.e., unlocked position, so that, when the key is inserted into the theft protection device no forces larger than in the known theft protection devices need by overcome. In operation, the tongue member carried on the spring makes contact with a raised cam only after rotation into the unlocked position. Complicated matching of spring forces of the individual springs to each other is rendered unnecessary. A strong spring can be used for reliable engagement of the latch without thereby impairing the operational reliability of the lock, and in particular, the axial return movement of the controller cylinder and the cylinder core connected thereto. In order to insure the axial return movement, the spring associated with the rotary extension piece can be made appropriately stronger.

In one embodiment of the invention, means are provided to cock the spring associated with the protruding tongue member when the controller cylinder is rotated into the unlocked position. This embodiment provides a cam having an inclined surface over which the tongue member slides such that when the controller cylinder is rotated into the ready to lock position the tongue member no longer engages with the cam and the latch to which the cam is attached is ready to be disposed in a locked or parked position. In such a case, it is preferred that the springing means which urges the tongue member onto or in engagement with the cam and which is carried by a shoulder member via a compression spring preferably disposed between a pressure member. This compression spring is desirable one which is axially immovable with respect to the controller cylinder and is fastened thereto. In such case, it is further preferred that the tongue member carried on the pressure spring be axially movable in the controller cylinder.

DESCRIPTION OF THE DRAWINGS

The present invention can be more readily appreciated when reference is made to the accompanying drawings which show various positions of the internal parts of the theft protection device of the present invention. Referring to the accompanying drawings:

FIG. 1 is a longitudinal cross section elevation of a theft protection device wherein the parts are in the parking position with the key removed;

FIG. 2 is a cross sectional elevation taken along the line II—II of FIG. 1, showing a theft protection device of the present invention;

FIG. 3 is another cross sectional elevation taken along the line I—I of FIG. 1;

FIG. 4 is a longitudinal cross sectional elevation of a theft protection device of the present invention, showing the disposition of the parts when the key is inserted;

FIG. 5 is a cross sectional elevation taken along the line III-III of FIG. 4;

FIG. 6 is a cross sectional elevation similar to FIG. 5, showing the disposition of the parts in driving position;

FIG. 7 is a cross sectional elevation taken along the line IV-IV of FIG. 4, showing the position of parts in driving position;

FIG. 8 is a longitudinal cross sectional elevation of the theft protection device of the present invention, showing the disposition of parts in unlocked position with the key inserted; and FIG. 9 is a cross sectional elevation taken along the line V-V of FIG. 8.

SPECIFIC EMBODIMENT

A preferred embodiment of the present invention is illustrated in the accompanying drawings in which the theft protection device is shown comprising a receptacle 1, which is fastened at the part of the vehicle which is to be locked and which contains the part of the protection device. On the side accessible to the driver, a lock cylinder 2 is arranged in the receptacle 1 in a close-fitting and positively locked manner. Lock cylinder 2 consists of a cylinder housing 3 in which a core sleeve 4, which is secured against axial displacement, is rotatably supported. A core member 5 is axially movably arranged in the core sleeve 4. In the core member 5 are spring-loaded plate tumblers 6 and a key slot 7. At the end 9, facing away from the key entrance 8 of the key slot 7, the core member 5 is provided with an extension 10 fixed thereto which extension has flats on opposite sides. Extension 10 with flats is brought through a cutout 13, corresponding to the cross section of the extension 10, of a disc 14, which is firmly connected with the core sleeve 4. The core sleeve 4 is thereby coupled with the core member 5 in a rotationpproof manner.

Referring to FIG. 1, in the vicinity of the key entrance 8 there are disposed in a recess 15, more visible in FIGS. 4 and 8, loose cylindrical rollers 16 and 17, which in the stop position shown in FIG. 1 rest practically without play within the recess 15 against the end face 18 and the side walls 18a, 18b of the core sleeve 4 and the end face 19 of the core member 5, if the key is removed. These rollers 16 and 17 can be considered as displaceable members which define the key opening. At the points 40 and 41 the recess 15 goes over, via beveled surfaces 43 and 44, following the side walls 18a and 18b into the wider space of the core sleeve 4 which contains the core member 5. A compression spring 21, which is braced against the disc 14, shown in FIG. 4, acts on a shoulder area 20 provided at the end of the core member 5 on the extension side.

The extension 10 of the core member 5, engages with a close fit in a controller cylinder 22, with which it is firmly connected by a pin 23. See FIG. 1. The shaft 24 of the controller cylinder 22 is brought through a latch 25 and engages, closely fitting, with a rotatable part of an ignition-starter switch (not shown). The latch 25 is provided with an extension 26 on the other side of the shaft 24 which is in operative connection with the locking surface 27 of the controller cylinder 22. In the extension 26 there is located a protruding pin member 28 which is parallel to the controller cylinder 22 and is under the pressure of a locking spring 29. The spring 29 tends to urge the controller cylinder slightly toward the key opening by virtue of spring 29 when the key is removed from the device. The latch 25 is acted upon in the direction of the locking position by a compression spring 30.

In the controller cylinder 22 a movable, pin-shaped member in the form of a tongue 31 is provided. This member has attached thereto a spring member such as a compression spring 32 which bears against a shoulder or pressure element 34. This tongue member is movable with its axis parallel to the controller cylinder 22 and is arranged on the latch side in the area of the locking surface 27. Associated with the compression spring 22, which is guided on an extension 33 positioned inwardly of the compression spring, is the noted pressure element which sits on the controller cylinder 22 having an extension 35. On the latch 25, a raised cam 36 is arranged, which is provided with an inclined surface 37 sloping toward the center of the latch. As shown in FIG. 8, the core member and the controller cylinder have been displaced downwardly in the housing. The tongue member engages cam 36. Note that in FIG. 8 the latch is in ready to lock position.

To operate the theft protection device, starting from the parking position with the key 38 pulled out as shown in FIG. 1, the key 38 is placed in the keyhole 8 of the core sleeve 4 and the parts assume the positions shown in FIG. 4. In the process the loose rollers 16 and 17 are engaged and are displaceable downwardly from the recess 15. They pass over and are positioned on side walls 18a and 18b with the least possible play, so that they are pushed by the key 38 into the core sleeve 4 so far until the beveled surfaces 43 and 44 beginning at the points 40 and 41, in conjunction with the wedge action of the key tip, make the rollers 16 and 17 give way laterally, according to the thickness of the key, when the rollers are displaced axially. In such position, the rollers 16 and 17 bear against the core member 5. The core member, against whose end face 19 the rollers 16 and 17 rest on one side, is thereby axially moved during this motion against the pressure of spring 21 which collapses into a position of tension. The key 38 slides between rollers 16 and 17 up to the stop in the key slot 7 of the core member 5 which key slot 7 is shown in FIG. 1. The entrance of the key puts the plate tumblers 6 in line for the releasing lock operation. The rollers 16 and 17 rest on the one hand against the flat sides of the key 38 and on the other hand, against the beveled surfaces 43 and 44, so that the core member 5 is fixed, through pressure on the end face side at the points 45 and 46, in its displaced position by means of the rollers 16 and 17.

The controller cylinder 22, which is firmly connected with the core member 5, is likewise moved and slides with its locking surface 27 along the extension 26 of the latch 25 and pushes with its surface 47, which faces the latch, the shoulder pin 28 into the extension 26 of the latch 25. This should pin 28 is pushed against the pressure of spring 29. The spring-loaded tongue member constructed of a shoulder screw machine part 31, which is positioned in turn in the controller cylinder 22, thereby gets into a region of latch 25 outside the cam 36. When rotated by means of the key 38, the surface 27 of the controller cylinder 22 acts on the extension of the latch 25 as seen by comparing FIGS. 3, 7 and 9. This movement moves the latch from the parked or locked position into the unlocked position. Shoulder pin 28 during this process slides along surface 27 of the controller cylinder 22 and is moved by the compression spring 29 into the upper, solid region of the controller cylinder. When the controller cylinder 22 is rotated, the shouldered tongue member 31 is displaced on an arc about the axis of the controller cylinder. The locking surface 27 of the controller cylinder 22 is shaped so that the cam 36, which is designed as in integral part of the latch 25, gets into the radial area of the part of the controller cylinder 22 that faces the latch by the movement of the latch 25 without being able to act on the shouldered tongue member 31. The specific shape of the cam 36 can be seen in FIGS. 1, 2, 4, 5, 6 and 8. It is also shown in phantom in the other figures. An ignition-starter switch located in the receptacle 1 is actuated in a known manner by the controller cylinder 22.

The transferring of the theft protection device into the stop or locked position from the ready to lock or open up position takes place in reverse order as described above. In such a case the shoulder pin 28 comes to rest at the upper part of the controller cylinder 22, as shown in FIGS. 8 and 9, and thereby holds the latch 25 in the unlocked position, which is designated as the ready to lock position. Through the fixation of the latch 25 in the unlocked position, it enters into the stop position when the controller cylinder 22 is rotated. During such operation, the spring loaded shouldered tongue member 31 moves over the inclined surface 37 of the cam into the region of the raised portion of that cam where it is moved against the pressure of the compression spring 32 braced in the controller cylinder 22. This process provides additional spring action for the axial return movement of the controller cylinders and lock parts.

To bring the latch 25 into the locked position, the rollers 16 and 17 must be displaced by the core member 5, which is under the action of the spring 21, and by the controller cylinder 22, which is under the influence of the compression spring 32 via the shouldered tongue member 31. Upon withdrawal of the key, shouldered pin 28 enters into the flat open portion 48 of the controller cylinder 22. Latch 25 is thereby released and can be moved into the locking position by the spring 30, whence the extension will be disposed as in FIG. 1. The raised portion of cam 36 of the latch 25 moves in this process out of the influence area of the spring loaded tongue member 31 of the controller cylinder and thus permits again the insertion of the key without action of the compression spring 32.

It is apparent from the above discussion that the advantages of the present invention are achieved by the use of a relatively weak spring member 21 which enables the return of core member 5 upon removal of the key. This action is also facilitated by the additional influence of the compression spring 32. By use of spring 21 the axial return motion of the controller cylinders required to reach the locking position is insured. The compression spring 32 is effective only in the ready to lock position. The strength of the supplemental spring 32 can be adapted to the requirements of each case without making the insertion of the key into the theft protection device more difficult or without having to struggle with complicated mechanisms for balancing the spring forces and tensions.

What is claimed is:

1. In a theft protection device with a cylinder lock comprising a lock cylinder core which is locked in the parking position in a lock cylinder housing which can be turned in said lock cylinder housing after axial displacement while in said parking position by the full insertion of a key for said device, said device having a controller cylinder coupled to said lock cylinder core in alignment therewith which controller cylinder is engageable by a latch in the parking position and which latch can be disengaged after axial displacement of said lock cylinder core and controller cylinder by revolution of said lock cylinder core and controller cylinder in a driving position, said latch held disengaged in a stop position by said controller cylinder and, in the unlocked position, is held in the disengaged position by said controller cylinder until said controller cylinder is axially displaced toward the key entrance, the improvement comprising a spring means on which said lock cylinder core is mounted and which urges said cylinder core in axial displacement when the key is withdrawn, spring means longitudinally mounted within said controller cylinder carrying a protruding tongue which tongue engages in unlocked position a cam on said latch whereby to hold said latch in disengaged position, said spring means biasing said controller cylinder whereby disengagement of said tongue from said cam urges said controller cylinder axially toward the key entrance when the key is withdrawn and effects disengagement of said latch with said controller cylinder.

2. An apparatus according to claim 1, wherein said cam housing inclined surface on which said tongue slides whereby when said tongue slides over said cam said spring biasing said controller cylinder is cocked and disposed for axial displacement on withdrawal of the key.

3. A device according to claim 2, wherein said spring means carrying said tongue is a compression spring arranged between a pressure member fastened to said controller cylinder, which is immovable in the axial direction relative to said controller cylinder and said tongue, said tongue being movable in the axial direction in the controller cylinder.

4. A theft protection device, particularly for a steering lock for motor vehicles, which comprises a lock cylinder core housed in a lock cylinder housing, said lock cylinder core being axially displaceable with respect to said housing, a key opening defined by displaceable means which are displaceable against said core when the key is inserted to effect axial displacement, said core biased toward said key opening by a coil spring, a controller cylinder disposed in axial alignment with said core and affixed thereto, said core and said controller cylinder rotatable in said housing, said controller cylinder containing a tongue member carried by an internally positioned spring mounted against a shoulder, said tongue projecting from said controller cylinder and engageable with a cam of a latch which engages said controller cylinder whereby when said tongue engages said cam said latch is held in an unlocked position by said controller cylinder.

5. A theft protection device according to claim 4, wherein said latch further comprises springing means for urging said latch into locked position, said controller cylinder comprising an eccentric member, said latch has an extension member housing a spring which urges a protruding portion against a face of said controller cylinder so as to position the controller cylinder and core toward the key opening, said eccentric engages said extension member upon revolution of said core and said controller cylinder whereby upon axial displacement of said controller cylinder from entry of a key, said protruding member is displaced within said extension and said latch is removed upon revolution from a locked position to an unlocked position.

* * * * *